July 17, 1928.
D. D. PEEBLES
1,677,364
METHOD OF TREATING FISH
Filed Sept. 7, 1927
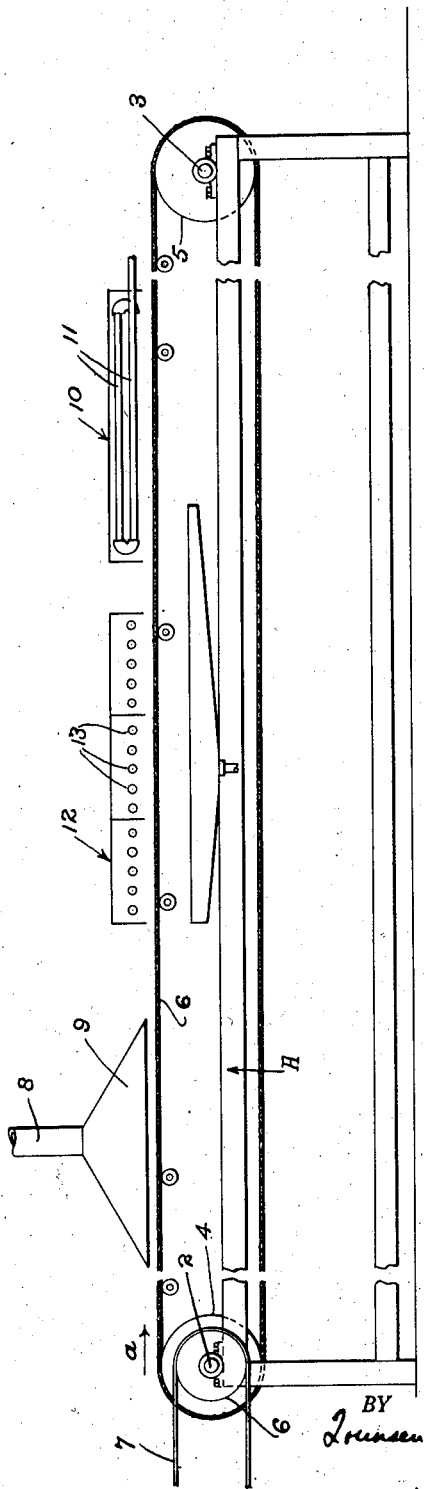
INVENTOR.
DAVID D. PEEBLES.
BY
ATTORNEYS.

Patented July 17, 1928.

1,677,364

UNITED STATES PATENT OFFICE.

DAVID D. PEEBLES, OF EUREKA, CALIFORNIA.

METHOD OF TREATING FISH.

Application filed September 7, 1927. Serial No. 217,968.

This invention relates to a method of treating fish such as sardines and the like and especially to a method whereby the flavor and taste may be improved, the fish shrunk, the skin set, a portion of the water extracted and as much of the oil removed as possible without excessive handling and mutilation prior to placing the fish in the cans and sealing and finally cooking and sterilizing the same.

In canneries where sardines are packed it has been found that considerable shrinkage takes place when the sardines are cooked, and further that it is desirable to remove a portion of the oil content of the fish and to preserve the naturally sweet flavor of the sardines.

It is, accordingly, customary to shrink the sardines, cook the flesh and remove a portion of the oil prior to cooling and placing the sardines in the cans and sealing (after which the final cooking of the bone and sterilizing is done) as flavor and appearance would otherwise be detrimentally affected. For instance, if sardines were placed in cans without pre-shrinkage and extraction of oil, they would shrink to such a degree during the cooking operation that sufficient space would be produced to permit free movement of the fish within the cans. Such movement during shipping and handling would cause the fish to become marred and broken and as considerable oil would also be liberated in the can during the cooking operation, the appearance would be unsatisfactory when the can was opened by the consumer and the product would not be as salable.

The most common method employed by canners to insure pre-shrinkage and removal of oil is, briefly stated, as follows:

After the fish has been prepared as by scaling, removal of heads, entrails, etc. and washed, they are first placed on endless conveyors and passed through a drier to dry off the wash water and a portion of the water content in the fish, thereby drying the skin. Secondly, they are loaded into comparatively large wire baskets and then dipped in hot oil or hot brine for the purpose of preshrinking the fish and for toughening or setting the skin, and for cooking the meat. Third, the baskets containing the fish are then partially drained and sometimes subjected to a steaming operation after which they are placed in a room to drain and cool. Fourth, after cooling, the baskets are emptied upon the packing tables and the fish thus delivered to the packers who pack them one by one in the cans. Fifth, the cans containing the fish are in some instances sauced and passed through an exhaust box and the lids are then applied and double seamed. Sixth, the cans containing the fish are then subjected to a final cooking and sterilizing operation when they are ready for labeling and shipment to the market.

The objections to this method are several. In the first step described where the fish are placed on conveyors and passed through driers, the fish are tumbled and dropped from one conveyor to another as several superposed conveyors are employed. This tumbling and dropping of the fish tends to bruise and break the fish and the skin. When the fish are soft, it is almost impossible to dry them properly. Temperature control of drier is also difficult. In the second step where the fish are loaded into the baskets and submerged in hot oil, it must be considered that the fish are again handled with chances of further breakage. The baskets are fairly large and the fish are placed in contact and on top of each other in several layers. This is objectionable as they have a tendency to adhere to each other and to the basket when cooled, due in part to the coating of oil which is left on the fish after submersion in the hot oil and to the glue formed by the skins. The oil coating oxidizes to some extent in a manner similar to a varnish and becomes sticky, and some glue is formed by the skins; hence, when the fish are dumped out on the packing tables, the fish which adhere to each other and to the baskets must be separated with the result that pieces of skin are pulled off or the fish is broken. A loss of 10% or more of the fish by breakage and mutilation at this point is quite common. Another and serious objection is the cooking of the fish in oil. Some packers employ a bath of cotton-seed oil or the like in which to cook the fish, but it is obvious that this may soon become mixed or substantially replaced by fish oil due to the oil rendered or driven out of each individual fish as it passes under the oil bath and to the carrying out of the original oil by the fish. Most packers, however, use cotton-seed oil. This makes comparatively little difference as either cotton-seed oil or fish oil soon becomes thick, partially rancid and decomposed due to oxidation and evaporation at the temperature maintained. Moreover, due to the continuous addition of particles of skin and broken portions of fish, scales and sardine entrails which are carried over to the oil tank and settle to the bottom, the oil becomes polluted and the acidity tends to become excessive. In other words, the cooking of the fish in the oil bath for the purpose of shrinking it and cooking the meat does not add to the delectable flavor desired, but conversely, detracts from the naturally sweet sardine flavor; and furthermore, the cooked fish picks up the flavor of the fry oil. The flavor of the brine-cooked fish is superior to that of the oil cooked fish, but the appearance of the finish product when canned is such as to render the fish unsightly, and not salable as the best pack.

Another objectionable feature is encountered in the third step where the fish are subjected to a cooling operation, i. e., after the fish have been cooked in the hot oil or hot brine and then drained and steamed, the baskets containing the fish are placed in a large room where they are permitted to remain anywhere from ten to forty-eight hours, the object being that of allowing a further small amount of shrinkage, draining off of oil and thoroughly cooling the fish before delivery to the packers who place them in the cans. This long period of standing is decidedly undesirable as it permits contamination, the cooked flesh is in contact with the uncooked bone which aids bacterial growth causing some putrification; moreover, the flesh tends to darken markedly when standing. The oil coating on the fish tends to become more or less rancid, thereby imparting a rancid taste to the fish.

The object of the present invention is to generally improve and simplify methods of the character described and especially to provide a method of improving the appearance of the fish, color of the flesh and flavor, of pre-shrinking the fish and removing as much of the oil as possible, to accomplish these operations in a minimum of time with substantially no disturbance or handling of the fish, to prevent contamination and putrification, and to prevent splitting or breaking the fish or the skin, moreover avoiding a long cooling period.

For the purpose of describing the method forming the subject matter of the present application, reference will be made to the accompanying drawing which is a diagrammatic view of one form of apparatus which may be employed.

Referring to the drawing, A indicates a main frame at the opposite ends of which are journalled shafts 2 and 3 carrying pulleys 4 and 5. Supported by the pulleys is an endless conveyor 6 which is preferably constructed of a foraminous material, such as wire netting or the like. Power may be transmitted to drive the endless conveyor in the direction of arrow $a$, for instance through means of a driving pulley 6 and a belt 7. Disposed adjacent to one end of the belt where the fish to be treated are delivered, is a downwardly directed pipe 8 on the lower end of which is mounted a distributor head 9. This pipe is connected with an air blower or the like and a heater and warm air are continuously projected downwardly against the surface of the conveyor and the fish supported thereby. Arranged adjacent the opposite end of the conveyor is a cooler of the refrigerating type which is generally indicated at 10. The cooler consists of a housing, interior of which is mounted a series of coils 11 through which a refrigerating medium is circulated in any suitable manner. Any other suitable cooling apparatus may, however, be employed. Disposed intermediate the cooler 10 and the hot air delivering pipe 9 is a housing generally indicated at 12, and mounted interior thereof is a plurality of electric heating elements 13. The housing may be divided into three or more compartments as shown and the heating elements may be heated to varying temperatures so as to gradually heat the fish as the conveyor passes underneath, the heating of the fish being accomplished by the radiant heat energy projected by the radiant heating elements.

In actual operation the fish to be canned are usually passed through a scaler after which the heads and entrails are removed and the fish are washed. This part of the operation is not disclosed in the diagrammatic drawing as standard methods or machinery are employed therefor and used in most canneries. After the fish are cleaned they are delivered to a foraminated conveyor indicated at 6. The fish are spread out over the foraminated conveyor so as not to contact with each other and as they pass under the head 9 they are subjected to a blast of warm dry air. The air dries off the water and it also partially dries the fish, thereby tending to shrink the fish and harden the skin. During the continued movement of the conveyor 6, the fish pass under the heater 12 where the fish will be subjected to the radiant heat of the elements 13. The fish are gradually brought up to a desired temperature and they are broiled and are at the same time sufficiently heated to render or drive out oil, the primary object being that of cooking the meat, setting the skin, removing as much of the oil as possible, properly shrinking the fish, and improving the flavor and appearance preparatory to cooling and placing the fish in the cans for the final cooking and sterilizing operation. After the fish have been broiled, they pass through the cooler 10 and are here rapidly cooled. The conveyor may be extended to the point where the packers are stationed and the fish in their separated condition may be picked directly from the belt and placed in the cans, and the cans are then passed through an exhaust box and the lids are then applied. The cans are then sealed and subjected to the final cooking and sterilizing operation.

The present application merely relates to the method of heating the fish to improve flavor, the pre shrinking the fish and to remove oil and some water. The steps of scaling, cleaning, etc., and of placing the fish in the cans and of sealing and final cooking and sterilizing the same form no part of the present application as customary practice may there be resorted to. Suffice it to say, that it is desirable to pre-shrink the fish, broil the meat, imparting thereby a delectable flavor to the meat, remove the oil, and handle the fish as little as possible as handling of the fish or contact of the fish with each other tends to bruise or break the fish and the skin. In the present instance, pre-shrinking and broiling takes place without any handling whatsoever as the fish are not touched from the time they are delivered to the conveyor 6 until they are picked off by the packers. The preliminary drying operation such as subjecting the fish to a blast of hot air or otherwise may or may not be employed as one or more units may be added to the radiant energy heater indicated at 12. Such units could be operated at lower temperatures and as such would serve the same function, to-wit, that of drying off the wash water and partially drying and hardening the skin. It might also be stated that the fish are brought up to temperature by the radiant energy so that danger of bursting or splitting the skin of the fish is substantially eliminated. However, if it is desired to increase the speed of the operation, it has been found that the oil may be liberated more rapidly by subjecting the fish to one or more perforating operations before they are subjected to the radiant energy. Such perforation may be accomplished in numerous ways and illustration thereof is accordingly thought unnecessary.

While certain features of the present invention are more or less specifically described and illustrated, I wish it understood that various changes may be resorted to within the scope of the appended claims; similarly, that the materials and finish of the several parts employed may be such as the manufacturer may dictate or varying conditions or uses may demand.

Having thus described my invention, what I claim and desire to secure by Letters Patent is:—

1. In a method of treating raw fish after it has been cleaned and washed the steps which consist in first subjecting the fish to a drying action, to partially set the skin and liberate a portion of the water content, and secondly, subjecting the fish to a broiling action to cook the flesh, further set the skin, and partially render the oil.

2. In a method of treating raw fish after it has been cleaned and washed the steps which consist in first subjecting the fish to a drying action, to partially set the skin and liberate a portion of the water content, and secondly, subjecting the fish to a broiling action to cook the flesh, further set the skin, and partially render the oil, and third, subjecting the fish to a cooling action.

3. A method of treating raw fish after it has been cleaned and washed which consists in passing the fish through a zone where it is subjected to radiant heat energy, the radiant heat serving the function, first of partially drying and hardening the skin and liberating a portion of the water content, and secondly, raising the temperature of the fish sufficiently to broil the flesh, further set the skin, and partially render the oil.

4. A method of treating raw fish after it has been cleaned and washed which consists in passing the fish through a zone where it is subjected to radiant heat energy, the radiant heat serving the function first of partially drying and hardening the skin and liberating a portion of the water content, secondly, raising the temperature of the fish sufficiently to broil the flesh, further set the skin, and partially render the oil, third, and then passing the fish through a zone where it is subjected to a sufficiently low temperature to permit rapid cooling of the fish.

5. A method of treating raw fish after it has been cleaned and washed which consists in perforating the fish, passing the fish through a zone where it is subjected to sufficient heat to dry off the wash water and partially dry and harden the skin, then subjecting the fish to a broiling action to shrink the fish, further set the skin, broil the flesh, and partiallly render the oil, and then subjecting the fish to a cooling action.

DAVID D. PEEBLES.